3,385,039
FILTER
Valentine J. Burke and John M. Burke, Los Angeles, Calif., assignors to Burke and Company, Los Angeles, Calif., a corporation of California
Filed Dec. 20, 1966, Ser. No. 607,594
5 Claims. (Cl. 55—501)

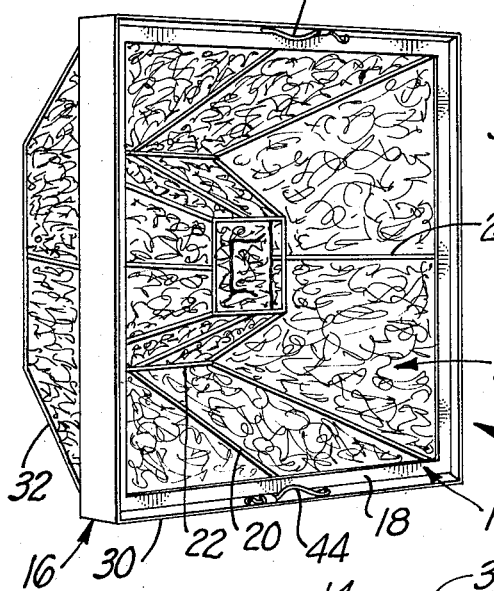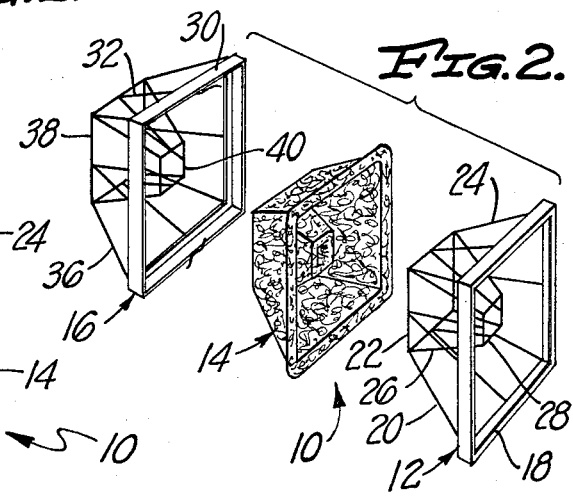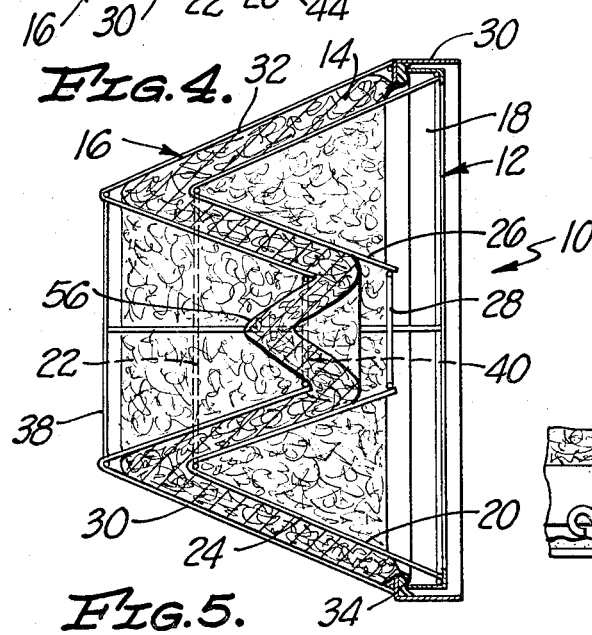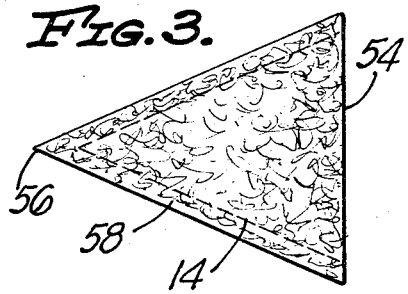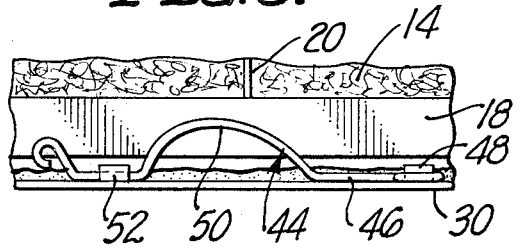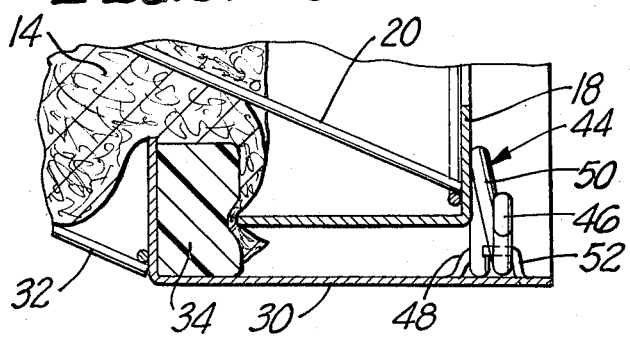
INVENTORS
VALENTINE J. BURKE,
JOHN M. BURKE
BY
EDWARD D. O'BRIAN
ATTORNEY United States Patent Office 3,385,039
Patented May 28, 1968

ABSTRACT OF THE DISCLOSURE

The filter of this invention has first and second compression grids and a filter element positioned between the grids. Each of the grids is fastened to a frame member, and the frame members are securable together to clamp the edges of the filter element. The grids and the filter element are formed as a semi-inverted pyramid. By separation of the frames and the grids the filter element is replaceable. This abstract is not considered to define the invention.

Background

This invention is directed to the field of filters particularly suited for the filtration of solid particles out of gas, and particularly solid contaminants out of air. Prior filter structures which have sufficient area for the filtration of large volumes of air have been formed as planar structures. When an extended filtration area was needed within a relatively restricted space, separate planar filter elements were set into the structure at angles to each other to provide this additional filtration area. No prior structures have been available which have extended area and still are of unitary construction which can be handled in one piece. Furthermore, since prior structures required individual, flat filters, more structure and more handling is required with such filters. For example, it is necessary to build more filter holding framework and more complex construction in a filter holding structure when flat filters are used. Thus, installation of extended area filters in restricted space has been both more expensive and required more filter handling upon the filter replacement than the filter of this invention.

Summary

This invention is directed to a filter particularly adapted for the filtration of solid contaminant particles out of gas. This is particularly important in the field of ventilation, where great volumes of air area transported, and dust and dirt must be filtered from the air before it is discharged into the ventilated spaces. Different situations have different ventilation requirements. The higher the volume of air handled, and the greater cleanliness requirements in the spaces ventilated require respectively filters of extended face area and filters of greater density to entrap the finer solids. The provision for extended facial area is accomplished in the filter of this invention by placing the filter element in the form of a semi-inverted pyramid when it is used for filtration. It is maintained in this form by means of inner and outer compression grids which restrain the filter. The inner and outer compression grids are respectively secured to frame members. These frame members cooperate together and are securable together, first to clamp the edges of the filter element to prevent air from bypassing the filter element and to secure the entire filter in its framework. The semi-inverted pyramid provides a highly desirable shape which confines the filtering element to a reasonable depth away from the supporting framework, and still provides the angular form necessary for extended filter element air area for a particular frontal area of the framework.

It is thus an object of this invention to provide a filter which has an element of extended filter area, the filter being a structure which can be handled as a unit for placement and removal. It is a further object of this invention to provide a filter which has a structural shape corresponding to a semi-inverted pyramid, and in which this structural shape is maintained by grids on the interior and exterior of the filter element. It is a further object of this invention to provide a filter wherein the filter element is replaceable by separation of its supporting grids and separation of its frames to free the filter element and permit placement therein of a new filter element. Other objects and advantages of this invention will become apparent from a study of the following portion of this specification, the claims and the attached drawings.

Description of the drawings

FIG. 1 is a perspective view, generally taken from the inlet side of the filter of this invention.

FIG. 2 is an exploded isometric view of the filter of this invention.

FIG. 3 is a side elevational view of a filter element before it is semi-inverted for installation in the filter of this invention.

FIG. 4 is a transverse section through the filter of this invention.

FIG. 5 is an enlarged detail, with parts broken away, showing the juncture between the frames of the filter of this invention.

FIG. 6 is an enlarged detail, with parts broken away, showing one of the locks which retain the frames together on the filter of this invention.

Description

Referring to the drawings, the filter of this invention is generally indicated at 10. Filter 10 comprises inlet retainer member 12, filter element 14 and outlet retainer member 16.

Inlet retainer member 12 comprises frame 18 which is an open centered rectangular frame made of angle iron with its flange turned inwardly. Furthermore, inlet grid 20 is secured to frame 18, preferably by welding the grid in the interior angle of the angle iron. Inlet grid 20 is formed of spaced bars which define a four sided truncated pyramid pointing toward an apex point to the left, as is seen in FIG. 4. However, the pyramid is truncated at a plane defined by connecting bar 22. At that point the side bars 24 of inlet grid 20 are turned toward frame 18. They are angularly related to frame 18 by being at the same angle as the side bars of the inlet grid between frame 18 and connecting bar 22. Thus, the interior bars 26 form an inverted part of a truncated pyramid, which is inverted at the truncated plane of connecting bar 22. The interior bars 26 terminate at connecting bar 28 and thus the pyramid is further truncated at the plane of connecting bar 28. The truncating plane at connecting bar 22 and the truncating plane at connecting bar 28 are each substantially parallel to the plane of frame 18. Furthermore, the truncating plane at connecting bar 28 is preferably located at or slightly short of frame 18, as is shown in FIG. 4. Thus, the inlet grid 20 can be considered a semi-inverted truncated pyramid.

Outlet retainer member 16 similarly comprises frame 30 and outlet grid 32. Frame 30 is also rectangular shape and open centered structure made of angle iron, with the flange of the angle pointed inward. However, the size of frame 30 is such that frame 30 is positioned away from the inlet face so that the frame 18 can nest within frame 30. Additionally, sealer member 34 is positioned against the flange of frame 30 in such a position as to be engaged by the leg of the angle iron which forms frame 18, as is seen in FIG. 5. Sealer member 34 is preferably resilient to provide proper seal between the two frames. Foamed polyurethane synthetic polymer composition material is particularly suitable for sealer member 34, although other resilient structures are also useful, depending upon individual circumstances.

Outlet grid 32 is secured to frame 30 on the discharge side of the flange of frame 30, as is seen in FIG. 5. Outlet grid 32 is again a four sided structure comprised of grid bars 36 which point toward a pyramidal apex having the same pyramid angle as the angle of inlet grid 20. This structure appears as a truncated pyramid framework. Furthermore, grid bars 36 are spaced from side bars 24 so as to leave space therebetween for filter element 14. The grid bars extend to the truncated plane defined by connecting bar 38 and at that point are directed toward the inlet side to terminate at connecting bar 40. The inverted portion of outlet grid 32 lies spaced from the inverted portion of inlet grid 20. Thus, the truncated end of the pyramid at connecting bar 40 is spaced from the truncated plane as defined by connecting bar 28. This structure also appears as a truncated pyramid framework.

Retention of inlet retaining member 12 within outlet retaining member 16 is accomplished by means of locks 42 and 44. Lock 44 is illustrated in enlarged detail in FIGS. 5 and 6. Lock 44 comprises a resilient spring wire 46 which is secured to frame 30 by securing means 48. This is the fixed end of lock 44. Wire 46 is provided with loop 50 which extends away from the web of frame 30 and past the flange of frame 18, as seen in FIGS. 5 and 6. Beyond loop 50, wire 46 extends toward frame 30 where it is retained by retainer 52. The locked position is shown in FIGS. 5 and 6. In order to release the lock, the wire is displaced from beneath retainer 52 and is moved outward over the inlet edge of frame 30. Preferably wire 46 is formed so that the handle end of the wire springs out away from frame 18, so that loop 50 releases frame 18. When both locks 42 and 44 are moved into such position, frame 18 may be withdrawn and replaced. After it is replaced, the handle of wire 46 is moved inside of frame 30 and engaged over retainer 52 to provide solid thrust of frame 18 against sealer member 34.

Filter element 14 is formed as a porous structure which can pass air and which will retain suspended air contaminants. The density of filter element 14 is dependent upon the number of interrelated factors including desired air capacity through the filter, pressure drop across the filter and the optimum cleanliness of the air at the filter outlet. These factors can be interrelated to obtain an optimum filter element for a particular purpose. Referring to FIG. 3, the filter element 14 is made up in conical form. The cone has a base 54 and an apex 56. Uniform side walls 58 of the cone form the cone. The length around base 54 is substantially the same as the peripheral distance around seal member 34. The cone angle is such that the cone fits over inlet retainer member 12, and particularly inlet grid 20 and lies over the grid at an appropirate angle.

The completed filter 10 is assembled by placing the inlet retainer member 12 on a suitable horizontal surface and placing the filter element 14 over it. Preferably, the base edge of the cone extends over frame 18. Thereupon the upper part of the cone is semi-inverted into the interior of inlet retainer member 12, as defined by interior bars 26. However, apex 26 remains directed in the original direction. Thereupon, outlet retainer member 16 is placed on a suitable horizontal surface with its frame 30 upward. Inlet retainer member 12 is inverted, with a filter element 14 in position thereon, and this entire structure is then placed inside of the outlet retainer member 16. While this was being done, the lower edge around base 54 of filter element 14 is engaged outside of frame 18 and is located against sealer member 34. This action clamps base 54 against the sealer member around its entire periphery so that the filter element is clamped all the way around its edges. Furthermore, at inlet retainer member 12 and filter element 14 are inserted into the outlet retainer member 16, the filter element is squeezed between the grids and is thus shaped into the semi-inverted pyramidal shape of the grids.

In appropriate cases where the filter element is thicker than the space between the grids, the filter element is squeezed down to size. In any event, the filter element is fully restrained and held into the desired semi-inverted pyramidal shape. Locks 42 and 44 are employed to hold the members 12 and 16 together. During insertion of the inlet retainer member 12, the locks are held in the out of the way position with loop 50 extending over the outer edge of frame 30. Thus, frame 18 can pass interiorly of the loops to the position shown in FIGS. 1, 4 and 5. The disengaged position of the locks is shown in FIG. 2. After the retainer members are in the proper position, the locks are lifted so that their loops are moved inwardly to engage the outer face of frame 18 and the locks are engaged under their retainers 52. Preferably the locks 42 and 44 are formed in such a manner that when in the locked position shown in FIG. 5, they continue to maintain a spring load closing force upon the retainer members to securely clamp the edge of filter element 14 to maintain complete sealing.

Replacement of the filter element 14 can be accomplished by reversing the steps. The locks 42 and 44 are unlocked, the retainer member is separated, filter element 14 is removed and discarded. Thereafter, a new filter element 14 is placed in position in the manner described above. With the filter element in position, the filter 10 is ready for placement within a filter holding framework, either alone or in association with additional filters. Of course the real advantage of the present filter is that it has extended filter face area without additional frontal or projected area. The amount of available area is determined by the pyramidal angle. If the pyramid is more upright, it will have more filtration area as compared to frontal area. If the pyramid is less upright, the structure will have less depth, but it will also have less filter area as compared to frontal area. The semi-inverted pyramid of this filter provides the filtration area in this manner and yet conserves on overall filter depth by using the semi-inverted shape. The overall size of the structure is thus suitable for many applications where filter frontal area is restricted.

Furthermore, with the filter of this invention it is clear that improved filtration of air in existing system can be obtained because of the extended area filters. Lower air velocity through the filter permits finer filtration because with lower velocity through the filter media, more dense filter media can be used to provide this improved filtration result. With the proportions illustrated in the drawings, the velocity of the gas being filtered, in the direction at right angles to the surface of filter element 14, is only one third of the velocity through frame 18 of inlet retainer member 12. Thus, three times as much filter area is provided as compared to the filter area on ordinary, flat filter. This provides an additional advantage with respect to filter loading. Since the additional area of filter element 14 is available, contaminants which are filtered out of the gas stream are spread over a larger area and thus the filter does not fill as quickly. This is even true in the progressive loading, progressive density filter elements which are particularly suited in the filter of this invention.

This invention having been described in its preferred embodiment, it is clear that it is susceptible to numerous modifications and embodiments within the ability of the routine artisan and without the exercise of the inventive faculty. Accordingly, the scope of this invention is defined by the scope of the following claims.

We claim:

1. A filter having first and second spaced retainer members and a filter located between said retainer members wherein the improvement comprises:

each of said retainer members having a continuous polygon open frame and a grid extending from its frame, each of said grids including a series of spaced members, a first multi-sided truncated pyramid framework attached at one end to and pointed away from one side of the frame upon which said first framework is located and the series of members defining a second multi-sided truncated pyramid framework extending from the extremity of the first framework upon which said second framework is located so as to extend and be pointed into the interior of said first framework, said retainer members being fitted together so that the frames on said retainer members are located adjacent about a common center line to one another and so that said grids of said retainer members are located next to one another, sealing means located on one of said frames, the filter element having an outer perimetrical edge located against said sealing means, said filter element extending from said outer edge between said grids so as to be held thereby; and means holding the other of said frames against the edge of said filter element and said sealing means and securing said frames together.

2. A filter as claimed in claim 1 wherein:
said filter element prior to installation in said filter has a conical shape.

3. A filter as claimed in claim 1 wherein:
said filter element terminates in an apex which is unsupported by said grids and which is directed away from said frames.

4. A filter as claimed in claim 1 wherein:
said holding means are lock means capable of exerting spring tension so as to hold the edge of said filter element against said sealing means.

5. A filter as claimed in claim 1 wherein:
said filter element prior to installation in said filter has a conical shape,
said filter element terminates in an apex which is unsupported by said grids and which is directed away from said frame, and
said holding means are lock means capable of exerting spring tension so as to hold the edge of said filter element against said sealing means.

References Cited

UNITED STATES PATENTS

| 971,895 | 10/1910 | Joedicke | 55—493 |
| 1,567,937 | 12/1925 | Galarneau | 210—485 |
| 1,639,170 | 8/1927 | Fell | 210—497 |
| 2,016,033 | 10/1935 | Christofferson | 55—500 |
| 2,496,757 | 2/1950 | Sieling | 210—485 |
| 2,564,845 | 8/1951 | Holt | 55—374 |
| 2,776,726 | 1/1957 | Brace | 55—373 |
| 2,938,597 | 5/1960 | Bolyai | 55—379 |
| 3,034,772 | 5/1962 | Schulz | 55—500 |
| 3,273,321 | 8/1966 | Bauder et al. | 55—501 |

FOREIGN PATENTS 653,796  12/1937  Germany.

HARRY B. THORNTON, *Primary Examiner.*

B. NOZICK, *Assistant Examiner.*